No. 698,891. Patented Apr. 29, 1902.
R. W. H. BAILEY & A. W. BRIGHTMORE.
STEERING AND DRIVING GEAR FOR MOTOR VEHICLES.
(Application filed Dec. 2, 1901.)
(No Model.) 3 Sheets—Sheet 1.

WITNESSES:
Joseph H. Niles.
Henry Schubert.

INVENTORS
Arthur William Brightmore
Robert W. H. Bailey
BY George H. Wahle
ATTORNEYS.

No. 698,891. Patented Apr. 29, 1902.
R. W. H. BAILEY & A. W. BRIGHTMORE.
STEERING AND DRIVING GEAR FOR MOTOR VEHICLES.
(Application filed Dec. 2, 1901.)

(No Model.) 3 Sheets—Sheet 2.

WITNESSES:
Joseph H. Niles.
Henry Suhrbier.

INVENTORS
Arthur William Brightmore
Robert W. H. Bailey
BY
ATTORNEYS.

No. 698,891. Patented Apr. 29, 1902.
R. W. H. BAILEY & A. W. BRIGHTMORE.
STEERING AND DRIVING GEAR FOR MOTOR VEHICLES.
(Application filed Dec. 2, 1901.)
(No Model.) 3 Sheets—Sheet 3.

WITNESSES:
Joseph H. Niles.
Henry Suhrbier

INVENTORS
Arthur William Brightmore
Robert W. H. Bailey
BY
ATTORNEYS.

UNITED STATES PATENT OFFICE.

ROBERT WILLIAM HARVEY BAILEY, OF KINGSTON-UPON-THAMES, AND ARTHUR WILLIAM BRIGHTMORE, OF EGHAM, ENGLAND; SAID BAILEY ASSIGNOR TO SAID BRIGHTMORE.

STEERING AND DRIVING GEAR FOR MOTOR-VEHICLES.

SPECIFICATION forming part of Letters Patent No. 698,891, dated April 29, 1902.

Application filed December 2, 1901. Serial No. 84,401. (No model.)

*To all whom it may concern:*

Be it known that we, ROBERT WILLIAM HARVEY BAILEY, of 152 King's road, Kingston-on-Thames, and ARTHUR WILLIAM BRIGHTMORE, of Egham Hill, Egham, in the county of Surrey, England, have jointly invented certain new and useful Improvements in Driving and Steering Mechanism for Motor-Driven Road-Vehicles, of which the following is a specification.

This invention relates to the driving and steering mechanism of motor-driven road-vehicles, and especially to vehicles wherein the steering is effected by means of the driving road-wheels.

The object of the invention is to provide a simple form of driving-gear which with but slight addition may be also employed to cause the steering of the vehicle in a very rapid and efficient manner.

The invention consists in driving the road-wheels through differential gear and providing the finally-driven units of the same with brake-drums or the like by means of which either of the units may be retarded or released, according to the form of gear used, resulting in a slower speed of the respective driving road-wheel and a quicker speed in the opposite road-wheel, whereby a rapid steering movement is effected.

The invention further consists in steadying or adjusting the sensitiveness of the steering by providing a steadying brake device between the finally-driven elements of the differential gear or between the frame carried on the driving-wheels and the body of the vehicle, which are pivoted together.

Figure 1:
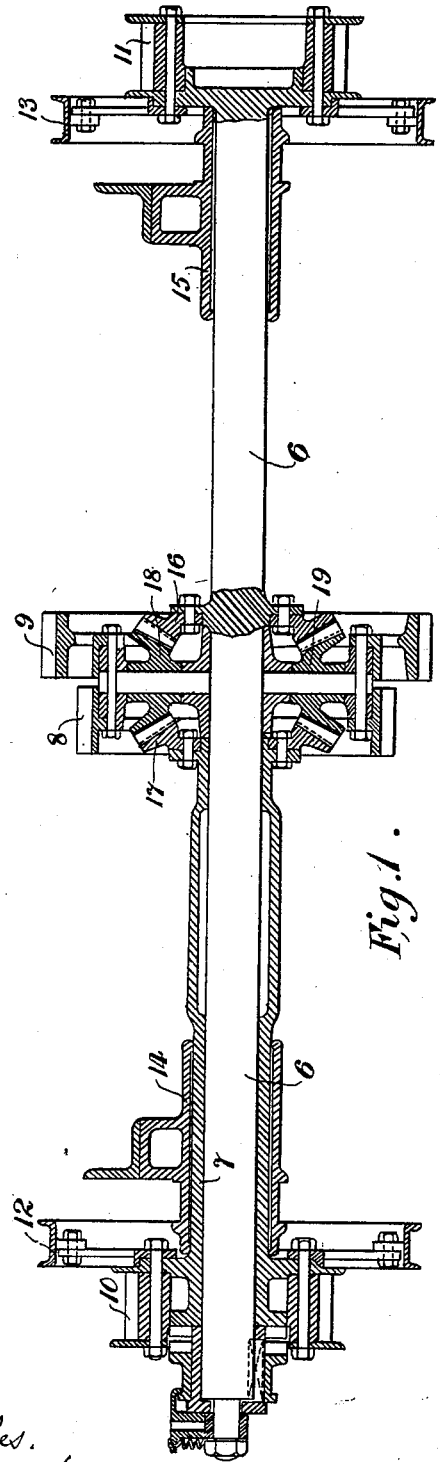
Figure 2:
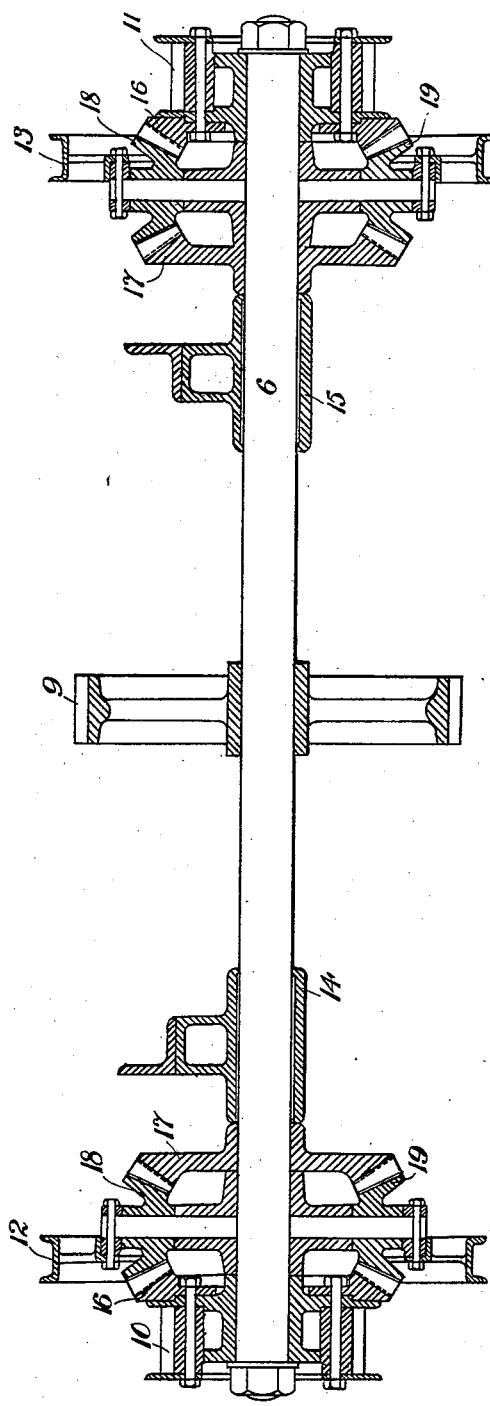
Figure 3:
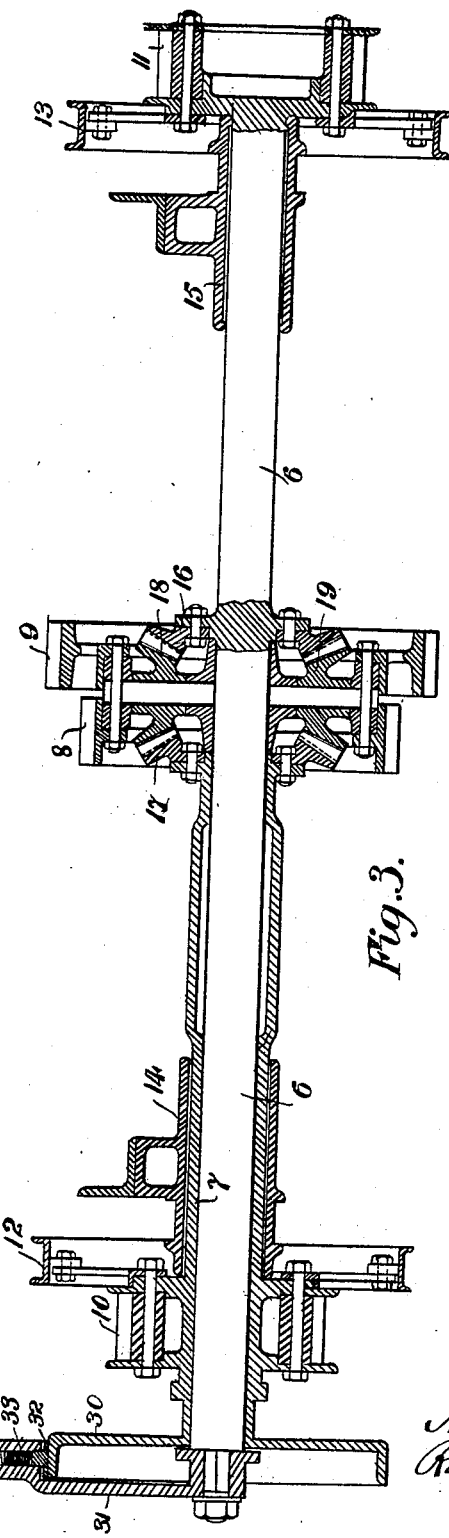

In the accompanying drawings, Figure 1 is a longitudinal section through a driving and steering gear constructed according to the invention and employing a single differential gear. Fig. 2 is a similar view of a driving and steering gear constructed according to a modification of the invention and employing a double set of differential gearing. Fig. 3 is a sectional elevation of a driving-gear similar to that shown in Fig. 1, but with an additional steadying brake device.

Similar numerals of reference indicate corresponding parts.

In carrying the invention into effect in the form as illustrated in Fig. 1 two bevel-wheels 16 17 are respectively mounted upon the driving-shaft 6 and a sleeve 7. Meshing with these wheels are planet-pinions 18 19, carried by the central chain-wheel, which is preferably provided with two toothed surfaces 8 and 9 in order to form a double-speed gear. Upon one end of the shaft 6, which is carried in bearings 14 15, and upon one end of the sleeve 7 are chain-driving pinions 11 and 10, secured to which are steering brake-drums 13 12.

When the vehicle is driven ahead both pinions 16 and 17 run at the same speed; but when it is desired to steer the vehicle the rotation of one or other of the brake-drums 12 13 is retarded, causing the respective pinion to slow up, resulting in a corresponding retardation of the respective road-wheel. The opposite pinion, however, will consequently be rotated at a higher speed, resulting in a quicker rotation of its respective road-wheel, and thereby effecting a rapid steering movement of the vehicle.

In the modification of the invention illustrated in Fig. 2 two sets of differential gear are employed, one at each end of the driving-shaft 6. Two bevel-wheels 17 17 are keyed upon the shaft and mesh with planet-pinions 18 19, carried by the brake steering-pulleys 12 13, which are loose upon the shaft. Gearing with the planet-pinions are bevel-wheels 10 11, running loose on the shaft. In the above-described mechanism brakes are applied to the pulleys 12 13 when the vehicle is traveling in a straight line, and when it is desired to steer the brake is released on the side to which it is desired the vehicle shall swerve, the other brake being still applied. Instead of the brake-pulleys 12 and 13 worm-wheels may be substituted, and when either worm-wheel is allowed to turn slightly by rotating the worm engaging with it the vehicle is caused to steer to that side.

To obviate a too sudden or rapid steering movement and to prevent any unequal resistance of the road on the driving-wheels turning the fore-carriage of the vehicle, a brake device is, according to one modification of the invention, introduced between the driving-shaft 6 and the sleeve 7, as shown in Fig. 3. The brake-disk 30 is secured to or formed in one with the sleeve 7, and arms 31 are attached to the shaft 6. The arms carry brake-blocks 32, pressed onto the periphery of the disk 30 by springs 33, adjusted by screws 34. Such a steadying-brake may in some cases be introduced between the frame carried on the driving-wheels and the body of the vehicle, which are pivoted together. By this means the delicacy of steering may be adjusted as desired.

Having thus described our invention, we claim as new and desire to secure by Letters Patent—

In motor-driven vehicles wherein the steering is effected by means of the retardation of one or other of the driving-wheels, the latter being driven by means of a differential gear, the combination of a brake device between the driving-shaft and the sleeve carrying a finally-driven unit of the differential gear, or between the frame carried on the driving-wheels and the body of the vehicle, for the purpose of steadying or adjusting the sensitiveness of the steering, substantially as described.

In witness whereof we have hereunto set our hands in the presence of two witnesses.

ROBERT WILLIAM HARVEY BAILEY.
ARTHUR WILLIAM BRIGHTMORE.

Witnesses to the signature of Robert William Harvey Bailey:
 GEORGE HIVES DAWSON,
 EDWARD BOUSTEAD CLARKE.

Witnesses to the signature of Arthur William Brightmore:
 ALBERT E. PARKER,
 FRANCIS J. BIGNELL.